(12) United States Patent
Hamano et al.

(10) Patent No.: US 8,150,823 B2
(45) Date of Patent: Apr. 3, 2012

(54) PRIVATE SEARCHING ON A PUBLIC SEARCH ENGINE

(75) Inventors: Yasuo Hamano, Kanagawa-ken (JP); Shinya Kawanaka, Tokyo (JP); Naruaki Masuno, Kanagawa-ken (JP); Yoshitaka Matsumoto, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 12/547,356

(22) Filed: Aug. 25, 2009

(65) Prior Publication Data
US 2010/0057709 A1   Mar. 4, 2010

(30) Foreign Application Priority Data

Aug. 26, 2008  (JP) .................................. 2008-216821

(51) Int. Cl.
*G06F 17/30* (2006.01)
(52) U.S. Cl. ........ 707/705; 707/706; 707/736; 707/737; 707/738; 707/763; 707/765; 707/767; 707/770; 707/780
(58) Field of Classification Search .................. 707/705, 707/706, 736, 737, 738, 763, 765, 767, 770, 707/780
See application file for complete search history.

(56) References Cited

U.S. PATENT DOCUMENTS

| | | | | |
|---|---|---|---|---|
| 5,855,018 | A * | 12/1998 | Chor et al. ..................... | 707/741 |
| 6,728,700 | B2 * | 4/2004 | Richards et al. ...................... | 1/1 |
| 6,745,180 | B2 | 6/2004 | Yamanoue | |
| 6,778,994 | B2 * | 8/2004 | Gogolak .............................. | 1/1 |
| 6,928,437 | B2 | 8/2005 | Shibuya et al. | |
| 7,058,944 | B1 * | 6/2006 | Sponheim et al. ............ | 718/100 |
| 7,305,428 | B2 | 12/2007 | Sakata | |
| 7,725,481 | B2 * | 5/2010 | Bruecken ...................... | 707/758 |
| 7,877,368 | B2 * | 1/2011 | Waters et al. ................. | 707/706 |
| 7,984,169 | B2 * | 7/2011 | Brunell et al. ................ | 709/229 |
| 2002/0103806 | A1 | 8/2002 | Yamanoue | |
| 2002/0156845 | A1 | 10/2002 | Sakata | |
| 2002/0174115 | A1 | 11/2002 | Shibuya | |

(Continued)

FOREIGN PATENT DOCUMENTS

JP  8320873 A  12/1996

(Continued)

OTHER PUBLICATIONS

Ogawa Yashushi, et al., "Efficient evaluation method of complex queries in n-gram indexing", Information Processing Society of Japan, May 1999, vol. 40, No. SIG 5 (TOD2).

(Continued)

*Primary Examiner* — Thanh-Ha Dang
(74) *Attorney, Agent, or Firm* — Shimokaji & Assoc., PC

(57) ABSTRACT

The present invention provides a search apparatus, method and program using a public search engine, which is capable of acquiring necessary information without allowing confidential information to be inferred. Input of a desired search word comprising characters is received, and characters are extracted from the search word. Multiple character strings comprising the extracted characters are generated. A word is selected as a noise word, and characters are selected from the noise word. A noise character string comprising the extracted characters is generated. A query is generated by combining the character strings and noise character strings, and is transmitted to the search engine. A search is performed by use of the search word over a search result transmitted from the search engine in reply to the query, and the search result is displayed.

9 Claims, 4 Drawing Sheets

U.S. PATENT DOCUMENTS

| | | |
|---|---|---|
| 2003/0187837 A1* | 10/2003 | Culliss ............... 707/3 |
| 2004/0034628 A1 | 2/2004 | Numao et al. |
| 2007/0174269 A1* | 7/2007 | Jing et al. ............ 707/5 |
| 2010/0023509 A1 | 1/2010 | Adachi |

FOREIGN PATENT DOCUMENTS

| | | |
|---|---|---|
| JP | 11-259512 | 9/1999 |
| JP | 2002132813 A2 | 5/2002 |
| JP | 2002278970 A | 9/2002 |
| JP | 2002-297606 | 10/2002 |
| JP | 2002312377 A2 | 10/2002 |
| JP | 2002351908 A2 | 12/2002 |
| JP | 2004021654 A2 | 1/2004 |
| JP | 2008-216821 | 9/2008 |

OTHER PUBLICATIONS

Advanced Crypto Software Collection—http://acsc.csl.sri.com/privss/.

William Gasarch, A Survey on Private Information Retrieval.

* cited by examiner

PRIVATE SEARCHING ON A PUBLIC SEARCH ENGINE

BACKGROUND OF THE INVENTION

The present invention relates to a search technology, and more specifically, to a search apparatus, search method and search program using a public search engine.

At present, a variety of public search engines may be provided on the Internet, and can be accessed by anyone. However, when a search is made for confidential information (such as patent information, information on new product development, technical know-how, and personal information), there may be a risk of having the confidential information inferred based on keywords included in the search queries.

In order to resolve this sort of problem, Japanese Patent Application Publication No. Hei 11-259512 (Patent Document 1) discloses a data search system in which a data search apparatus performs a search after concealing or obscuring from the data search apparatus all of or a part of a search condition inputted to the data search apparatus, and then refines a result of the search. In order to conceal or obscure the search condition, this system deletes, from all of inputted search conditions, previously registered search conditions that should be concealed, replaces the inputted search conditions with synonyms or hypernyms thereof, adds an unnecessary search condition to the inputted search conditions, or divides each of the inputted search conditions into several search terms.

However, because this system changes search conditions in the above-described manner, it involves a problem of acquiring only an insufficient amount of necessary information, or acquiring an enormous amount of unnecessary information.

Japanese Patent Application Publication No. 2002-297606 (Patent Document 2) discloses a database access system which allows a user to use an information providing service while treating as confidential a search condition that the user wants to conceal. A client computer transmits to a server computer an encrypted query obtained by encrypting confidential data items that are included in search conditions. While encrypting searched data in the same manner as the confidential data items are encrypted, the server computer performs a data search by encrypted data matching without decrypting the encrypted search conditions.

However, this system uses encryption to merely conceal how search conditions are combined (AND, OR, NOT, etc). Additionally, another problem is that a processing load associated with the encryption and the data matching therefore becomes large.

Other than those mentioned above, there have been proposed the following search methods.

"Private Information Retrieval (PIR)": There has been a problem that, while a server retains data of N bits, a client acquires 1 bit out of the N bits without informing the server. A simple solution to this problem is that the server should transmit all of the N bits to the client. Since the 1990's, however, there have already been study results indicating that, on the assumption of existence of multiple servers and computational complexity, the problem can be solved without needing transmission of all of the bits. These are mathematical basic theories and have not yet been put to practical use.

"Oblivious Transfer (OT)": Whereas PIR may allow a client to acquire information other than information wanted by the client, OT allows a client not only to make settings for achieving the search method based on PIR, but also to design a protocol for allowing the client to only acquire data wanted by the client, excluding information other than the wanted data. Additionally, in the case of OT, there is no limit to volumes of communication. OT is the same as Symmetric PIR described in Non-patent Document 1. OT is also a theory, and there have been almost no examples of actual implementation thereof.

"New techniques for private stream searching": In this method, a query is encrypted on a server side by use of a public key of a user, and an index is encrypted at the same time. Thereby, the user can acquire a search result without making information known to the server. However, because this method needs to be implemented on the server side, users cannot utilize search servers generally used in public.

Japanese Patent Application Publication No. Hei 11-259512, and Japanese Patent Application Publication No. 2002-297606 are examples of the related art.

In addition, Japanese Patent No. 2008-216821 is an example of the related art.

Therefore, there is a need for searching without revealing search words to a search engine.

SUMMARY OF THE INVENTION

In one aspect of the present invention a search apparatus connecting a public search engine is disclosed. The search apparatus comprises: search-word input means for receiving input of a desired search word comprising three or more characters; valid-character-string generation means for extracting two or more arbitrary consecutive characters from the search word inputted to the search-word input means and generating a plurality of valid character strings each comprising of the extracted characters; noise-word selection means for selecting an arbitrary word as a noise word; noise-character-string generation means for extracting two or more arbitrary consecutive characters from the noise word selected by the noise word selection means and generating a noise character string comprising the extracted characters; query generation means for generating a query by combining the valid character strings generated by the valid-character-string generation means and the noise character strings generated by the noise-character-string generation means; external search means for transmitting the query generated by the query generation means to the search engine; and internal search means for, by use of the search word inputted to the search word input means, performing a search over a search result transmitted back from the search engine in reply to the query transmitted from the external search means.

In another aspect, a search method using a public search engine is disclosed. The search method comprises the steps of: receiving input of a desired search word comprising three or more characters; extracting two or more arbitrary consecutive characters from the inputted search word and generating a plurality of valid character strings each comprising the extracted characters; selecting an arbitrary word as a noise word; extracting two or more arbitrary consecutive characters from the selected noise word and generating a noise character string comprising the extracted characters; generating a query by combining the generated valid character strings and the generated noise character strings; transmitting the generated query to the search engine; by use of the search word, performing a search over a search result transmitted back from the search engine in reply to the query.

In another aspect, a computer program product for implementing a search using a public search engine is disclosed. The computer program product comprises: computer program code receiving input of a desired search word comprising three or more characters; computer program code extracting two or more arbitrary consecutive characters from the inputted search word and generating a plurality of valid character strings each comprising the extracted characters; computer program code selecting an arbitrary word as a noise word; computer program code extracting two or more arbitrary consecutive characters from the selected noise word and generating a noise character string comprising the extracted characters; computer program code generating a query by combining the generated valid character strings and the generated noise character strings; computer program code transmitting the generated query to the search engine; and computer program code performing a search by use of the search word over a search result transmitted back from the search engine in reply to the query.

These and other features, aspects and advantages of the present invention will become better understood with reference to the following drawings, description and claims.

DETAILED DESCRIPTION OF THE INVENTION

Figure 1:
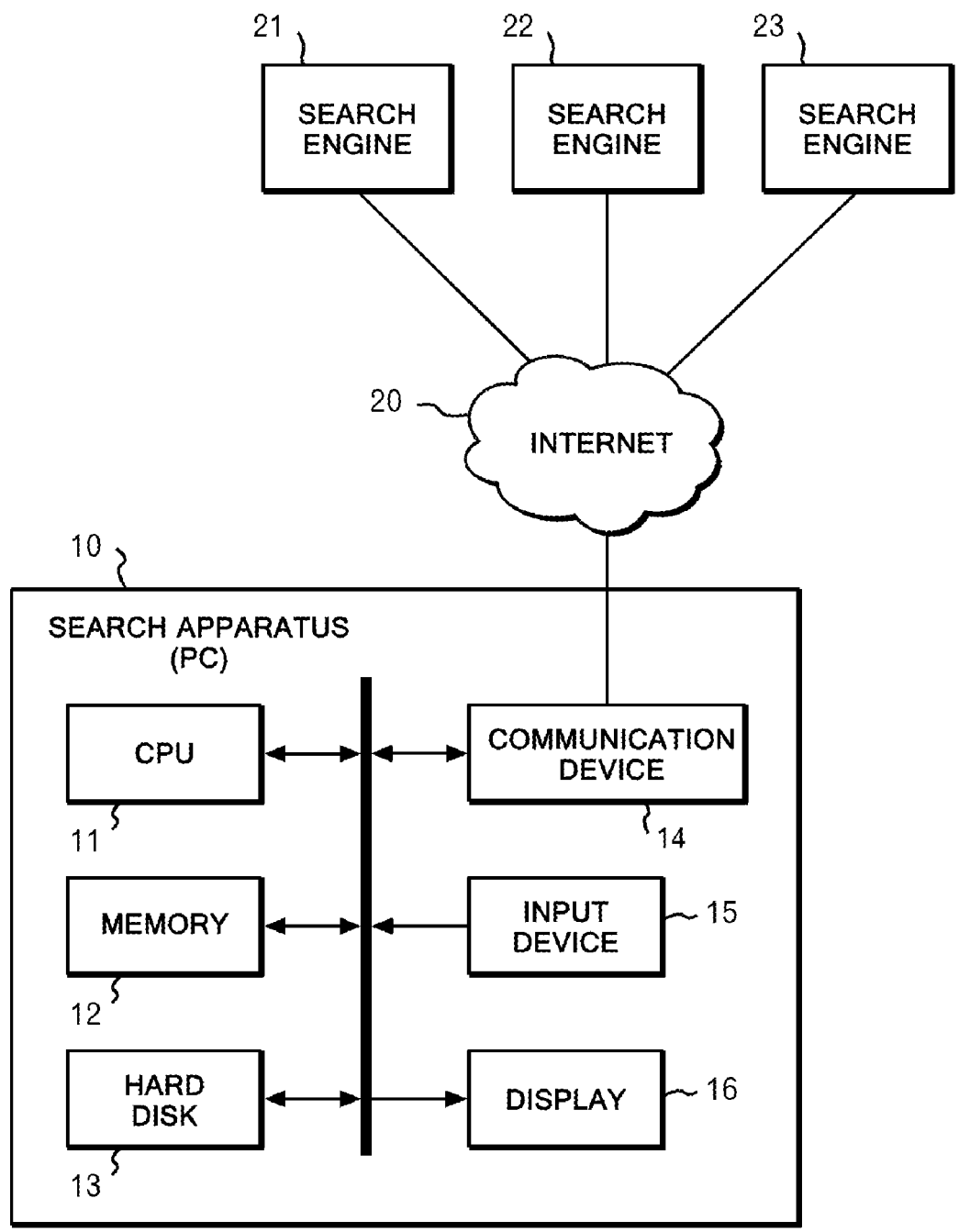
FIG. 1 is a functional block diagram showing a configuration of a search apparatus according to an exemplary embodiment of the present invention.

The following detailed description is of the best currently contemplated modes of carrying out the invention. The description may not be taken in a limiting sense, but may be made merely for the purpose of illustrating the general principles of the invention, since the scope of the invention may be best defined by the appended claims Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

As will be appreciated by one skilled in the art, exemplary embodiments of the present invention may be embodied as a system, method or computer program product. Accordingly, exemplary embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program may be printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as JAVA™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Exemplary embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

According to the present invention, the query may be generated by combining the valid character strings extracted from the search word and the noise character strings may be extracted from the noise word, and then can be transmitted to the search engine. Therefore, necessary information can be efficiently acquired without allowing confidential information to be inferred based on the search word.

The search apparatus further includes: general-word search means for transmitting general words as queries to the search engine; and dictionary generation means for generating a dictionary by extracting words from search results transmitted back from the search engine in reply to the queries transmitted from the general-word search means. The noise-word selection means may select an arbitrary word as the noise word from the dictionary generated by the dictionary generation means.

In this case, the dictionary appropriate to the search engine may be generated, whereby the number of hits resulting from a search by use of the noise word becomes larger than otherwise, and confidentiality of the search word becomes higher.

The number of valid character strings to be generated by the valid-character-string generation means may be increased according to an increase of the number of characters in the search word inputted to the search-word input means.

In this case, search accuracy becomes higher although confidentiality of the search word becomes lower.

The noise-character-string generation means may generate the noise character strings until the number of the noise character strings exceeds a predetermined threshold value.

In this case, confidentiality of the search word becomes higher although search accuracy becomes lower.

The noise-character-string generation means select the noise words until the number of the noise words exceeds a predetermined threshold value.

In this case, confidentiality of the search word may become higher although search accuracy becomes lower.

The present invention may also provide a search method and search program executed in the above described search apparatus.

Hereinafter, an embodiment of the present invention will be described in detail with reference to the drawings. Throughout the drawings, the same or corresponding parts are denoted by the same reference characters, and the descriptions thereof will not be repeated.

Referring to FIG. 1, a search apparatus 10 according to the embodiment of the present invention may include a CPU (central processing unit) 11, a memory 12, a hard disk 13, a communication device 14, an input device 15, and a display 16. The communication device 14 connects the search apparatus 10 to the Internet 20, transmits various requests to search engines 21, 22, 23, and receives various replies from the search engines 21, 22, 23. The input device 15 corresponds to a keyboard, a mouse and so on. The search apparatus 10 may be constructed by installing a later-described search program on a personal computer (PC). The search program may be provided by being set in a storage medium such as a CD-ROM, or by being downloaded from a server via the Internet 20. The search apparatus 10 can be connected to a terminal through a computer network as well as search engines 21, 22, 23.

Various businesses may construct the search engines 21, 22, 23 on WWW (World Wide Web) servers connected to the Internet 20 to provide website search services to the public for free or for a fee. The search engines 21, 22, 23 can transmit search results back in reply to search requests (queries) form an unspecified number of clients connected to the Internet 20. As one of these clients, the search apparatus 10 also may perform searches by using the search engines 21, 22, 23 being public as described above. Each of the search engines 21, 22, 23 used here may adopt an N-gram method.

Operations of the search apparatus 10 will be described below. The CPU 11 may execute the search program shown in FIG. 2.

Figure 2:
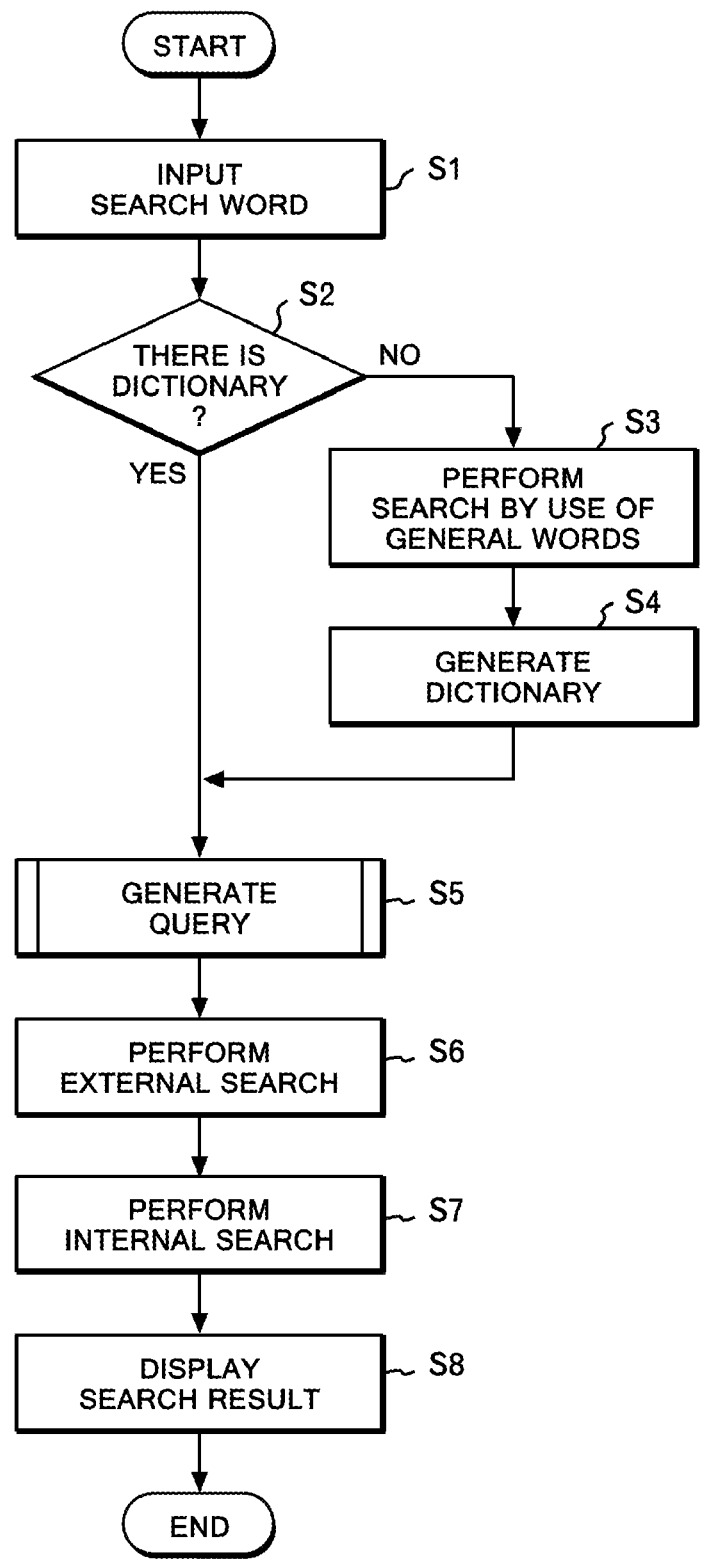
FIG. 2 is a flowchart showing a search program inside the search apparatus shown in FIG. 1 according to an exemplary embodiment of the invention.
Figure 3:
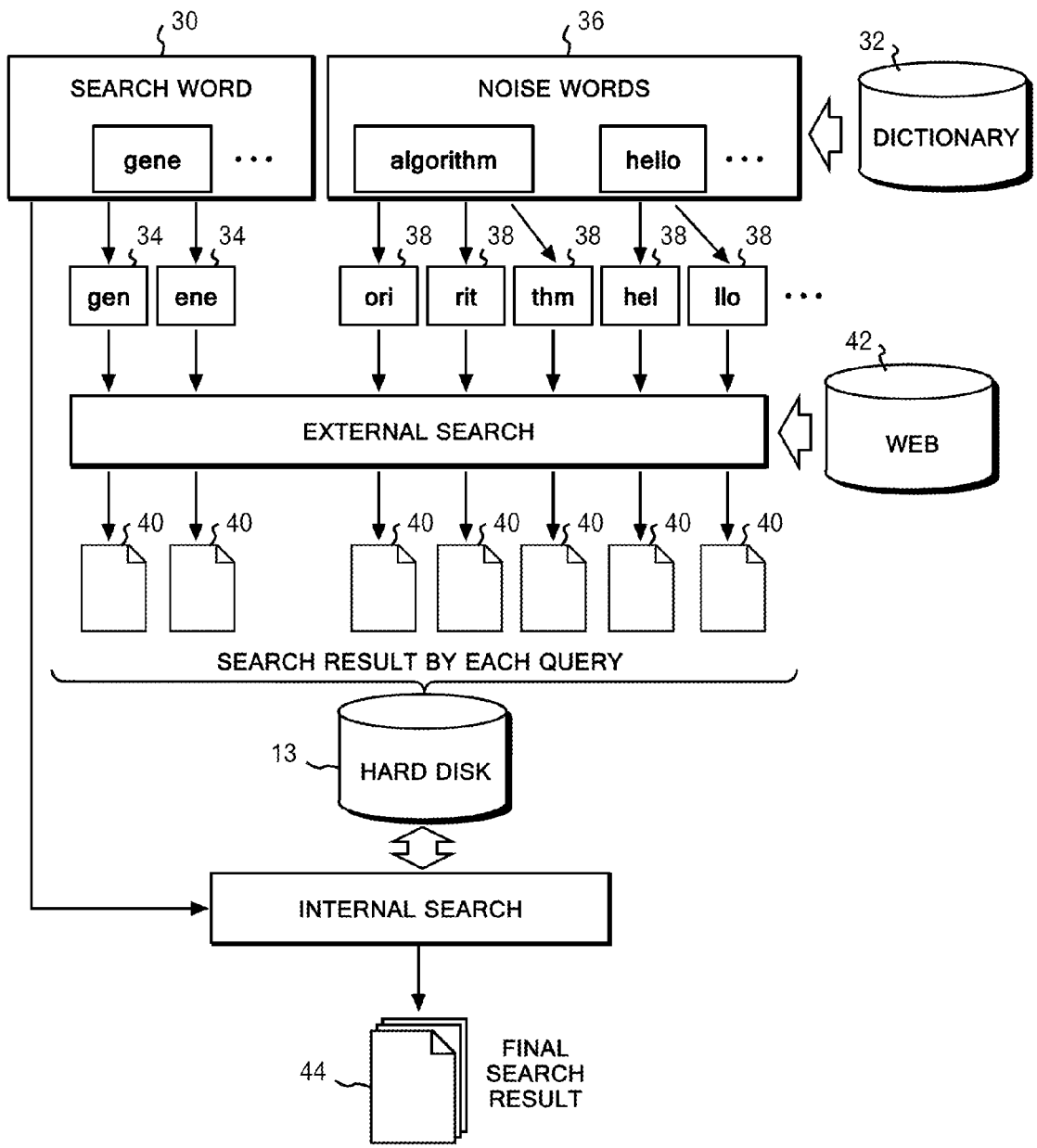
FIG. 3 is a diagram for explaining operations of the search apparatus shown in FIG. 1 according to an exemplary embodiment of the invention.

Referring to FIGS. 2 and 3, the search apparatus 10 may receive input of a desired search word (S1). Specifically, by operating the input device 15, a user may input one or more search words 30 on a screen displayed on the display 16, the search words 30 being related to information which the user tries to find. Each search word 30 may consist of three or more characters. In an example shown in FIG. 3, "gene" may be inputted as the search word 30.

Once the user selects out of the search engines 21, 22, 23 a desired search engine used for a search (hereinafter, description may be given by citing a case where the search engine 21 may be selected), the search apparatus 10 may judge whether a dictionary 32 exclusive to the selected search engine 21 has been already generated or not (S2).

When the dictionary 32 has not been generated yet (NO in S2), the search apparatus 10 can transmit general words as queries to the search engine 21 (S3). As general words, about 10 words such as "have" and "get" may be previously set up. These words may be transmitted as queries one by one to the search engine 21.

Subsequently, the search apparatus 10 can generate the dictionary 32 exclusive to the search engine 21 by extracting words from search results returned from the search engine 21 in reply to the queries (S4). In a case where 10 words are respectively set as the queries, 10 search results can be transmitted back from the search engine 21. Each of the search results may contain data (for example, a URL (uniform resource locator) of a Web page, a title, and a part of a main text) necessary to specify one or more Web pages searched out. Because the words transmitted as the queries may be general words, the search results may contain almost all of Web pages having been accumulated as indices in the search engine 21. Therefore, the dictionary 32 can be described as a collection of words of Web pages searchable by the search engine 21. Incidentally, when another search result may be acquired from the search engine 21, the dictionary 32 can be updated by being added with new words contained in the result.

Subsequently, based on the search words 30 inputted in Step S1, and also based on words in the dictionary 32 generated in Step S4, the search apparatus 10 can generate one or more queries which should be transmitted to the search engine 21 (S5).

Figure 4:
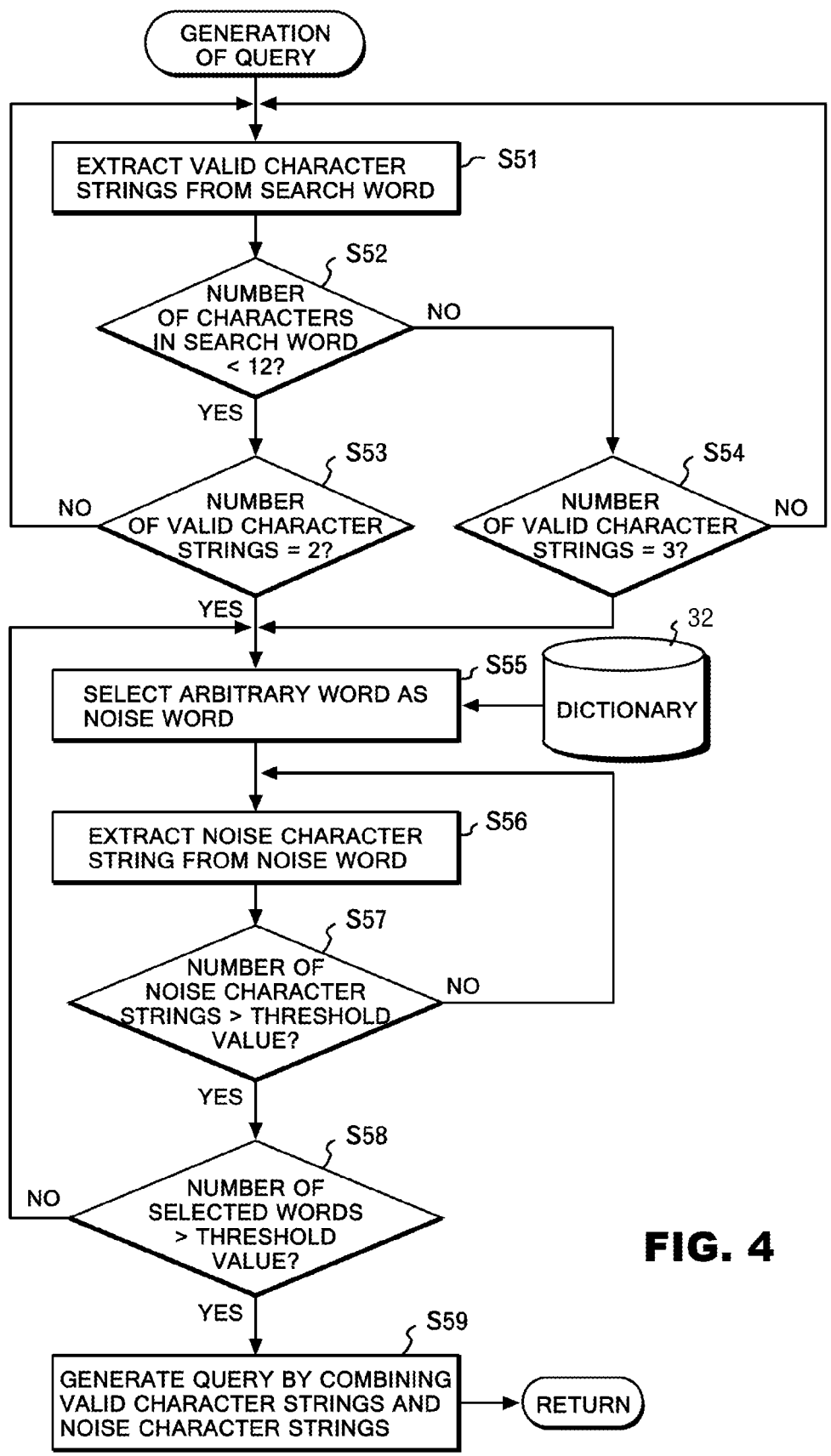
FIG. 4 is a flowchart showing a subroutine for query generation shown in FIG. 2 according to an exemplary embodiment of the invention.

Specifically, referring to FIG. 4, the search apparatus 10 can generate each of multiple valid character strings 34 by extracting two or more arbitrary consecutive characters in each of the search words 30 inputted in Step S1 (S51). Each of the valid character strings 34 may consist of the two or more characters thus extracted. If the number of characters in the search word 30 may be less than 12 (YES in S52), Steps S51 and S52 may be repeated until two valid character strings 34 may be generated (NO in S53). On the other hand, if the number of characters in the search word 30 may be not less than 12 (NO in S52), Steps S51 and S52 may be repeated to generate three valid character strings 34 (NO in S54).

In the example shown in FIG. 3, the valid character stings "gen" and "ene" can be extracted from the search word "gene." Each of the valid character strings 34 consists of 3 characters. If the number of characters in each of the valid character strings 34 may be increased, confidentiality of the search words 30 may become lower although search accuracy becomes higher. Additionally, if the number of the valid character strings 34 may be increased, confidentiality of the search words 30 may become lower although search accuracy becomes higher.

Incidentally, in a case where the multiple search words 30 are inputted, the multiple valid character strings 34 may be generated so that the valid character strings 34 can include characters from all of the search words. Here, the maximum possible number of the valid character strings 34 supposed to be generated may be previously determined. When the number of the search words 30 may be large, the valid character strings 34 may be generated so as not to exceed the maximum possible number.

Additionally, the search apparatus 10 may select one or more arbitrary words as noise words 36 from the dictionary 32 (S55). Subsequently, the search apparatus 10 may generate two or more arbitrary consecutive characters from each of the noise words 36, to thereby generate one or more noise character strings 38 (S56). Each of the noise character strings 38 may consist of the two or more characters thus extracted. Step S56 can be repeated until the number of the generated noise character strings 38 exceeds a predetermined threshold value (which may be, for example, twice as large as the number of the valid character strings 34) (NO in S57). Additionally, Steps S55 to S57 can be repeated until the number of words selected as the noise words 36 exceeds a predetermined threshold value (which may be, for example, three times as large as the number of the search words 30) (NO in S58).

In the example shown in FIG. 3, the noise character stings "ori," "rit" and "thm" may be extracted from the noise word "algorithm," and the noise character stings "hel," and "llo" may be extracted from the noise word "hello." Each of the noise character strings 38 consists of 3 characters, as in the case of the valid character strings 34.

Incidentally, although a word different from the search word 30 may be selected as the noise word 36, a word which may be the same as the search word 30 may be selected as the noise word 36. The noise word 36 can be one or more words.

If the number of the noise character strings 38 has exceeded the predetermined threshold value, and also if the number of the selected words has exceeded the predetermined threshold value (YES in S57 and YES in S58), the search apparatus 10 may generate one or more queries by combining the valid character strings 34 generated in Step S51 and the noise character strings 38 generated in Step S56 (S59). Although each of the queries may be constructed by logical multiplication (AND) of the valid character strings 34 and the noise character strings 38, each of the queries may also be constructed by logical addition (OR), negation (NOT), or combination of these.

Referring to FIG. 2 again, the search apparatus 10 can transmit the queries generated in Step S5 to the search engine 21 (S6). The search engine 21 may transmit search results 40 back to the search apparatus 10 in reply to the respective queries. The search apparatus 21 may previously generate indices (not illustrated) by indexing a large number of Webs 42 on the Internet 20 by using the N gram method. The search results 40 can be generated based on these indices.

Subsequently, the search apparatus 10 may perform a second search over the search results 40 transmitted back from the search engine 21 in reply to the respective queries, and thereby may generate a final search result 44 (S7). Because all of the search results 40 transmitted back from the search engine 21 may be temporarily saved in the hard disk 13 inside the search apparatus 10, the second search may be executed completely locally. Specifically, irrelevant Web pages, which would not be searched out if the main query may be otherwise transmitted, may be excluded from the search results by having the search results 40 filtered by using the search words 30. Thereafter, the search apparatus 10 may integrate multiple search results obtained by thus excluding the irrelevant Web pages.

Finally, the search apparatus 10 may display the final search result 44 generated in Step S7 on the display 16. If the user looks at the final search result 44 and judges it to be inadequate, steps from Step S59 may be executed again after combinations of the valid character strings 34 and the noise character strings 38 are changed.

As described above, according to the embodiment of the present invention, queries may be transmitted to the search engine 21 after having been generated as combinations of the valid character strings 34 extracted from the search word 30, and the noise character strings 38 extracted from the noise word 36. Accordingly, necessary information can be efficiently acquired without allowing confidential information to be inferred based on the search words 30. To be more specific, a large number of the valid character strings 34 and a large number of the noise character strings 38 may be included in the queries, whereby combinatorial explosion may occur even if restoration of the search words 30 may be tried on the search engine 21 side by combining the valid character strings 34 and the noise character strings 39. Accordingly, it may be almost impossible for the search words 30 to be inferred.

Additionally, the dictionary 32 appropriate to the search engine 21 may be generated. Consequently, the number of hits resulting from a search by the noise word 36 may become larger than otherwise, and confidentiality of the search words 30 may become higher. Additionally, the number of valid character strings 34 to be generated may be increased according to an increase of the number of characters in the search word 30. Specifically, two valid character strings 34 can be generated if the number of characters in the search word 30 may be less than 12; three valid character strings 34 may be generated if the number of characters in the search word 30 may not be less than 12. Thereby, search accuracy becomes higher although confidentiality of the search word 30 becomes lower. Moreover, the noise character strings 38 may be generated until the number thereof exceeds a predetermined threshold value, whereby confidentiality of the search word 30 can become lower although search accuracy becomes lower. Furthermore, the noise words 36 may be selected until the number thereof exceeds a predetermined threshold value, whereby confidentiality of the search word 30 may become higher although search accuracy becomes lower.

In the above embodiment, if the number of characters in the search word 30 may be less than 12, two valid character strings 34 can be generated, and, if the number of characters in the search word 30 may not be less than 12, three valid character strings 34 may be generated. However, the number of characters in the search word 30 which may be set as a threshold value may be not particularly limited, and the number of the generated valid character strings 34 may be not particularly limited, either. Additionally, the number of the generated valid character strings 34 may be not limited to being changed at one stage, and the number thereof may also be changed at multiple stages. In summary, the number of valid character strings 34 to be generated may be increased according to an increase of the number of characters in the search word 30.

Additionally, although the dictionary 32 appropriate to the search engine 21 may be used in the above embodiment, a general dictionary previously prepared may be used instead. In this case, processing for generation of the dictionary 32 becomes unnecessary although confidentiality of the search words 30 becomes lower.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be understood, of course, that the foregoing relates to exemplary embodiments of the invention and that modifications may be made without departing from the spirit and scope of the invention as set forth in the following claims.

Although the embodiment of the present invention has been described hereinabove, the above described embodiment may be merely exemplification for carrying out the present invention. Therefore, the present invention may not be limited to the above described embodiment, and can be carried out by appropriately changing the above described embodiment without departing from the spirit of the present invention.

What is claimed is:

1. A search apparatus connecting a public search engine, comprising:
   a computer processor configured to:
   receive search word input of a desired search word comprising three or more characters;
   extract two or more arbitrary consecutive characters from the desired search word and generate a number of first character strings, said number of first character strings being a plurality of first character strings each comprising the extracted characters;
   select an arbitrary word as a noise word;
   extract two or more arbitrary consecutive characters from the noise word and generate a noise character string comprising the extracted characters;
   generate a query by combining the generated first character strings and the generated noise character string;
   transmit the generated query to the public search engine;
   perform, by use of the desired search word, a search over a search result transmitted back from the public search engine in reply to the generated query;
   generate a dictionary by extracting words from the search result transmitted back from the public search engine in reply to the generated query; and
   replace the noise word with a word from the dictionary.

2. The search apparatus according to claim 1, wherein the computer processor is configured to display the search result transmitted back from the public search engine.

3. The search apparatus according to claim 1, wherein the computer processor is configured to:
   send the search result transmitted back from the public search engine to a terminal, wherein the desired search word comprises three or more characters from the terminal.

4. The search apparatus according to claim 1, wherein the computer processor is configured to transmit general words as queries to the public search engine.

5. The search apparatus according to claim 1, wherein the computer processor is configured to increase the generated number of first character strings according to an increase of the number of characters in the desired search word.

6. The search apparatus according to claim 1, wherein the computer processor is configured to generate a plurality of noise character strings until the number of the plurality of noise character strings exceeds a predetermined threshold value.

7. The search apparatus according to claim 1, wherein the computer processor is configured to select a plurality of noise words until the number of the plurality of selected noise words exceeds a predetermined threshold value.

8. A search method using a public search engine, comprising:
   receiving, by a computer processor, a desired search word comprising three or more characters;
   extracting two or more arbitrary consecutive characters from the received desired search word and generating a plurality of first character strings each comprising the extracted characters;
   selecting an arbitrary word as a noise word;
   extracting two or more arbitrary consecutive characters from the noise word and generating a noise character string comprising the extracted characters;
   generating a query by combining the generated first character strings and the generated noise character strings;
   transmitting the generated query to the public search engine;
   by use of the desired search word, performing a search over a search result transmitted back from the public search engine in reply to the generated query;
   generating a dictionary by extracting words from search results transmitted back from the public search engine in reply to the generated query, and
   replacing the noise word with a word from the dictionary.

9. A computer program product stored on a non-transitory computer readable medium, which when executed by a computer to implement a search using a public search engine, comprises:
   computer program code receiving input of a desired search word comprising three or more characters;
   computer program code extracting two or more arbitrary consecutive characters from the inputted desired search word and generating a plurality of first character strings each comprising the extracted characters;
   computer program code selecting an arbitrary word as a noise word;

computer program code extracting two or more arbitrary consecutive characters from the noise word and generating a noise character string comprising the extracted characters;

computer program code generating a query by combining the generated first character strings and the generated noise character strings;

computer program code transmitting the generated query to the public search engine;

computer program code performing a search by use of the desired search word over a search result transmitted back from the public search engine in reply to the generated query;

computer program code generating a dictionary by extracting words from search results transmitted back from the public search engine in reply to the generated query, and replacing the noise word with a word from the dictionary.

* * * * *